United States Patent
Cserteg et al.

(10) Patent No.: US 7,759,850 B2
(45) Date of Patent: Jul. 20, 2010

(54) DISCHARGE TUBE AND LAMP WITH COOLING CHAMBERS AND IMPROVED LUMINANCE

(75) Inventors: Erzsébet Cserteg, Erdösor u. (HU); Károly Tálosi, Herkules u. (HU); Arni Siti, Fövám tér (HU); Zhifu Liu, Shanghai (CN); Gábor Schmidt, Széchenyi u. (HU); János Orbán, Fészekrakó u. (HU); Tímea Seszták, Szent Imre herceg u. (HU)

(73) Assignee: General Electric Compan, Schenectady, NY (US)

( * ) Notice: Subject to any disclaimer, the term of this patent is extended or adjusted under 35 U.S.C. 154(b) by 360 days.

(21) Appl. No.: 12/060,547

(22) Filed: Apr. 1, 2008

(65) Prior Publication Data

US 2009/0243463 A1   Oct. 1, 2009

(51) Int. Cl.
*H01J 1/02* (2006.01)
*H01J 7/24* (2006.01)
(52) U.S. Cl. .............................. 313/44; 313/11; 313/33; 313/34; 313/484; 313/493
(58) Field of Classification Search ............ 313/11, 313/33, 34, 44, 484, 493, 27, 318.01–318.12
See application file for complete search history.

(56) References Cited

U.S. PATENT DOCUMENTS

| | | | | |
|---|---|---|---|---|
| 4,694,215 | A * | 9/1987 | Hofmann ................ | 313/44 |
| 4,871,944 | A * | 10/1989 | Skwirut et al. .......... | 315/56 |
| 5,717,277 | A * | 2/1998 | Siminovitch ........ | 313/318.02 |
| 5,769,530 | A | 6/1998 | Biro et al. | |
| 7,358,656 | B1 | 4/2008 | Yan | |
| 2002/0180352 | A1* | 12/2002 | Ilyes et al. ............ | 313/573 |
| 2004/0207326 | A1* | 10/2004 | Bajnok et al. .......... | 313/634 |
| 2005/0265018 | A1 | 12/2005 | Yasuda et al. | |

(Continued)

FOREIGN PATENT DOCUMENTS

DE   3544465 A1   12/1985

(Continued)

OTHER PUBLICATIONS

PCT/US2009/037764 International Search Report, mailed Jun. 5, 2009.

*Primary Examiner*—Sikha Roy
*Assistant Examiner*—Jose M Diaz
(74) *Attorney, Agent, or Firm*—Fay Sharpe LLP

(57) ABSTRACT

A discharge tube arrangement for a compact fluorescent lamp is provided. The tube forms a continuous arc path and has electrodes disposed at each end of the arc path. The discharge tube arrangement comprises a first cold chamber in order to control and maintain a required mercury vapor pressure. The first cold chamber is located in a longitudinal end portion of the tube arrangement. The discharge tube arrangement is further provided with at least one second cold chamber, which is positioned between the longitudinal end portions of the discharge tube arrangement. The at least one second cold chamber is positioned on the wall of the tube, and has a cold chamber wall protruding substantially away from the central axis of the discharge tube arrangement. The discharge tube arrangement may have a coiled configuration with helical tube portions or a multifinger configuration with straight tube members.

21 Claims, 8 Drawing Sheets

U.S. PATENT DOCUMENTS

2008/0231160 A1 * 9/2008 Yan .............................. 313/44

FOREIGN PATENT DOCUMENTS

| DE | 4133077 | A1 | 10/1992 |
| EP | 1 182 688 | A1 | 2/2002 |
| JP | 58 93153 | | 6/1983 |
| JP | 62 049853 | | 3/1987 |

* cited by examiner

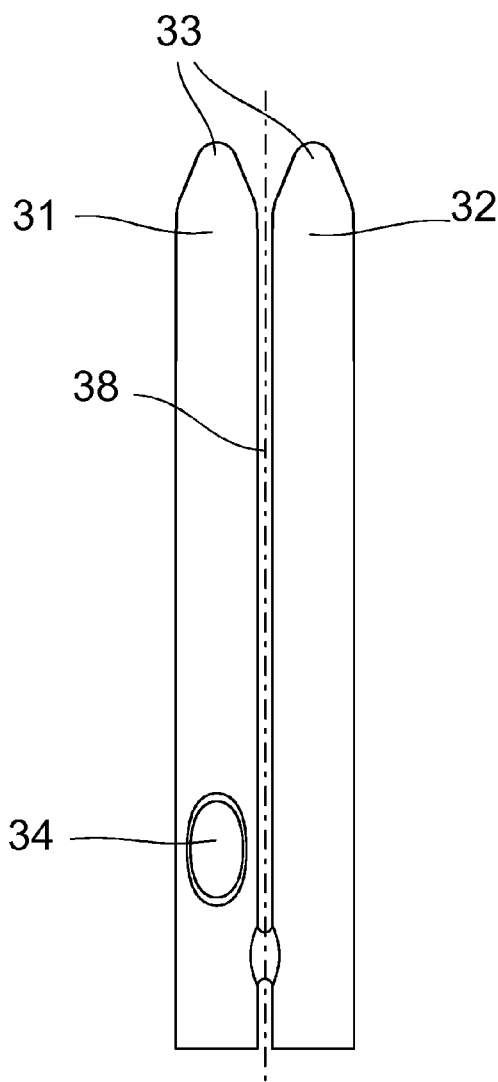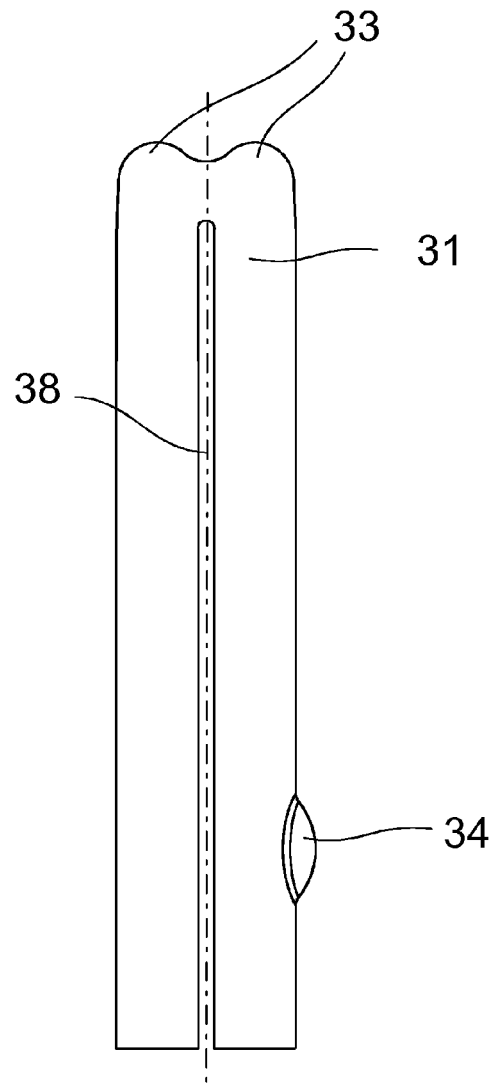
Fig. 9  Fig. 10
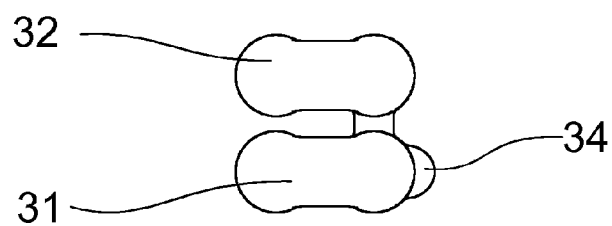
Fig. 11

DISCHARGE TUBE AND LAMP WITH COOLING CHAMBERS AND IMPROVED LUMINANCE

FIELD OF THE INVENTION

This invention relates to a low-pressure discharge lamp with improved luminance. The discharge lamp comprises a discharge tube enclosing a discharge volume. The discharge tube has sealed ends and is provided with means for generating and sustaining a discharge within the discharge volume. The lamp is further provided with a cold chamber portion in order to control and maintain a partial mercury pressure.

BACKGROUND OF THE INVENTION

Low-pressure discharge lamps are well known in the art. These lamps contain small doses of mercury, which radiates in the short range UV spectrum under the influence of a discharge arc. In order to achieve maximum luminous output or luminance, it is required that the mercury vapor is adjusted and stabilized at a well-defined partial pressure. This is possible by forming a so-called cold chamber on the discharge tube, and by selecting the appropriate temperature in the cold chamber, which is the coldest point of the gas discharge tube.

German Patent No. DE 35 44 465 discloses a U-shaped compact fluorescent lamp with two straight tube members and a connecting middle portion and a method for production. A cold chamber is defined by a longitudinal extension of the straight tube members beyond the connecting middle portion. The longitudinal extension is selected in the range of 0.16*D to 0.6*D, wherein D represents the diameter of the straight tube member. In this configuration, the cold chamber is positioned at an the end of the tube opposite to the electrodes. In vertical operation of the lamp, this will be the uppermost section when used in an upright or base-down position or it will be the lowest section of the lamp when used in a downward or base-up position, e.g. in a ceiling lighting. Such a cold chamber configuration will not provide the same effect when using the lamp in the upright or downward position. In the upright position, the temperature of the cold chamber will be significantly higher than in the downward position resulting in a lower luminous output.

German Patent No. DE 41 33 077 discloses a helical shaped discharge lamp, with a double helix discharge tube. In this known discharge lamp, the cold chamber is positioned at the top of the lamp, between the two ends of the tube portions constituting the strands of the double spiral. An annular widening of the discharge tube forms the cold chamber. However, the light distribution of the lamp in the region of the cold chamber still needs improvement, because a relative large portion of the enveloping surface is not utilized as lighting surface, particularly in the direction along the axis of the lamp, towards the end which is further away from the lamp housing. This is particularly configured so that is suitable for screwing in a socket on the ceiling, with the cold chamber facing downwards. Again, the lamp does not provide the same luminous output if it operates in a base-down position. The luminous efficacy of the lamp may be smaller by 10% or more.

Therefore, there is a need for a discharge tube or lamp, which exhibits improved luminance, e.g. no difference in the luminous output of the lamp may be perceived when the lamp is operated in different positions. More specifically, there is a need to provide a discharge tube or lamp, which does not exhibit a perceptible decrease in the luminous efficacy when operated in a base-down position instead of a base-up position. There is a further need for a lamp, which does not exhibit a perceptible decrease in the luminous efficacy when operated even in a horizontal position instead of a vertical base-up position. Therefore a discharge tube or lamp configuration is required, which has an efficient cold chamber for optimum performance of the lamp.

SUMMARY OF THE INVENTION

In an exemplary embodiment of the present invention, there is provided a discharge tube arrangement for a compact fluorescent lamp. This discharge tube arrangement has a central axis and longitudinal end portions, and is formed of at least one discharge tube made of glass, encloses a discharge volume which is filled with a discharge gas and has a fluorescent phosphor coating disposed on an inner surface portion of the tube. The tube forms a continuous arc path and has electrodes disposed at each end of the arc path. The discharge tube arrangement comprises a first cold chamber in order to control and maintain a required mercury vapor pressure, the first cold chamber is located in a longitudinal end portion of the tube arrangement. The discharge tube arrangement is further provided with at least one second cold chamber, which is positioned between the longitudinal end portions of the discharge tube arrangement. The at least one second cold chamber is positioned on the wall of the tube, and has a cold chamber wall protruding substantially away from the central axis of the discharge tube arrangement.

In another exemplary embodiment of the present invention, a compact fluorescent lamp defining a central axis and comprising a discharge tube arrangement is provided. This discharge tube arrangement has longitudinal end portions and is formed of at least one discharge tube made of glass, encloses a discharge volume filled with a discharge gas and has a fluorescent phosphor coating disposed on an inner surface portion of the tube. The tube forms a continuous arc path and has electrodes disposed at each end of the arc path. The discharge tube arrangement comprises a first cold chamber portion in order to control and maintain a partial mercury vapor pressure. The first cold chamber is located in one of the longitudinal end portions of the tube arrangement. The discharge tube arrangement of the lamp is further provided with at least one second cold chamber being positioned between the longitudinal end portions of the discharge tube arrangement. The at least one second cold chamber is positioned on the wall of the tube, and has a cold chamber wall protruding substantially away from the central axis of the lamp.

The discharge tube arrangement may have a coiled configuration with helical tube portions or a multifinger configuration with straight tube members.

The discharge tube and lamp with the second cold chamber portion has an improved luminous output in a base-down or horizontal position of the lamp. The light output of a compact fluorescent lamp of a relatively higher wattage can be increased by more than 10% using the second cold chamber. The second or further cold chambers on tube portions of the discharge tube may be easily formed with known manufacturing steps.

BRIEF DESCRIPTION OF THE DRAWINGS

The invention will now be described with reference to the enclosed drawings where FIG. 9 is a side view of the low-pressure discharge lamp shown in FIG. 8, with a second cold chamber, FIG. 10 is a side view of the low-pressure discharge lamp shown in FIG. 8, with a second cold chamber, FIG. 11 is a top view of the low-pressure discharge lamp shown in FIG. 8.

DETAILED DESCRIPTION OF THE INVENTION

Figure 1:
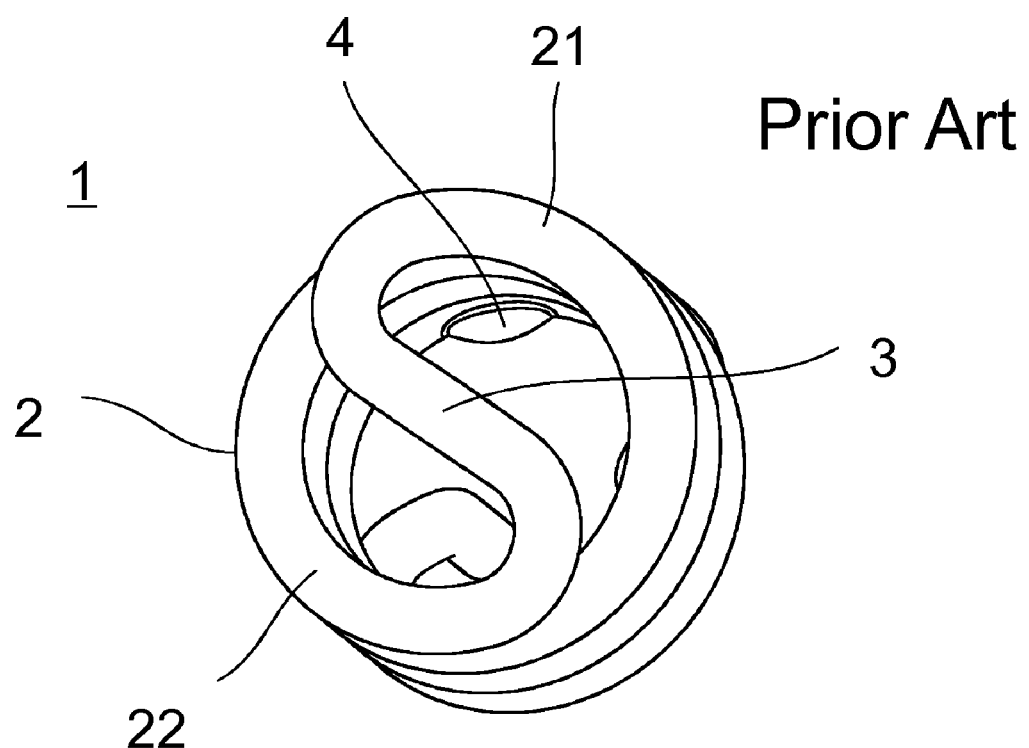
FIG. 1 is a perspective view of a prior art low pressure helical discharge lamp with a cold chamber formed on an inner tube wall.
Figure 2:
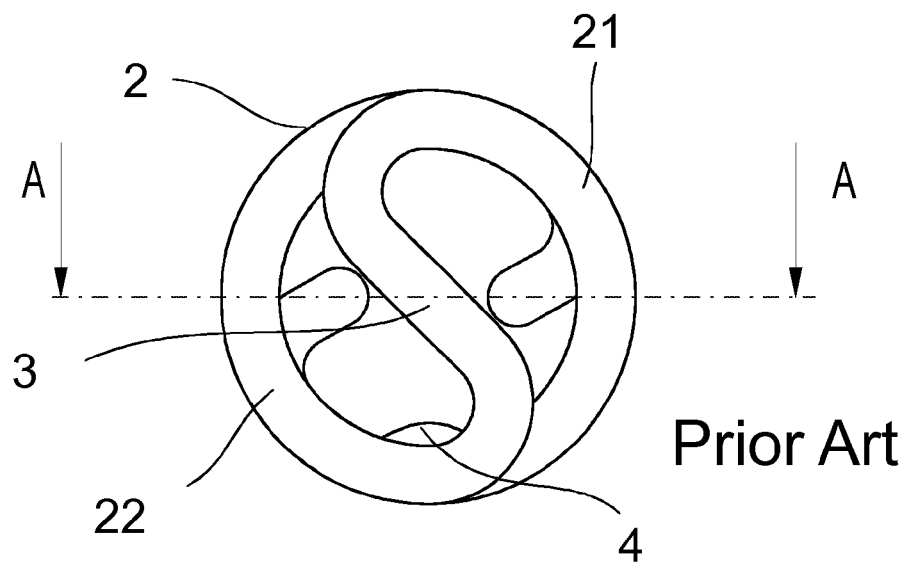
FIG. 2 is a top view of the prior art low-pressure discharge lamp shown in FIG. 1.
Figure 3:
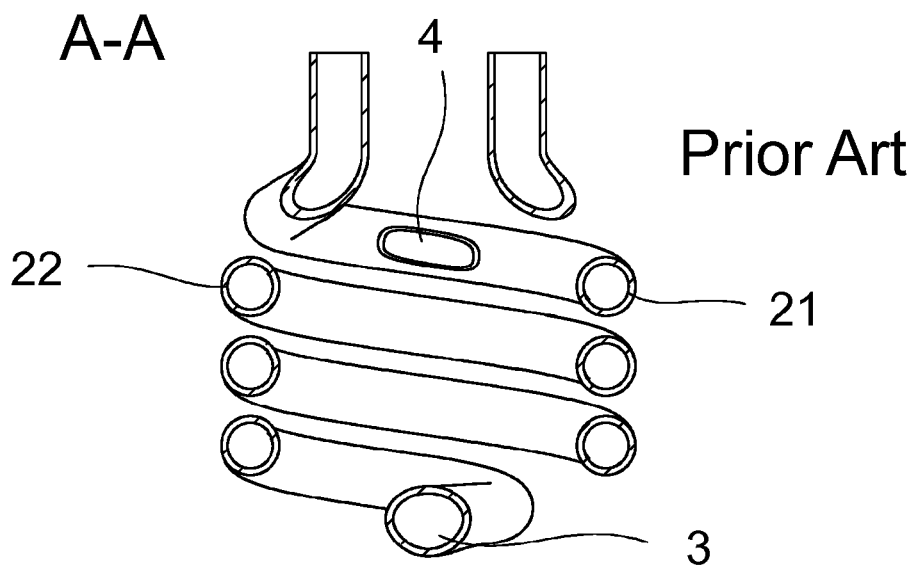
FIG. 3 is a cross sectional side view of the lamp shown in FIG. 2, taken along the plane A-A.

Referring first to FIGS. 1 to 3, there is shown a prior art compact fluorescent lamp 1 (CFL). The lamp 1 has a discharge tube arrangement 2 with sealed ends. The discharge tube encloses a discharge volume which is filled with a discharge gas and has a fluorescent phosphor coating disposed on the inner surface of the tube. The tube forms a continuous arc path and electrodes are disposed at each end of the arc path. In this prior art example, the lamp 1 has two spiral shaped discharge tube portions 21 and 22, which are interconnected by a turning part comprising a first cold chamber 3 in a middle portion of the turning part between the two tube portions 21 and 22. In order to increase the luminous output of the lamp in the base-down position of the lamp 1, a second cold chamber 4 is applied to the inner side of the spiral discharge tube. This configuration has not brought about the desired effect because of the heat developed in the neighborhood of the second cold chamber, as a result of which the coldest spot of the lamp is shifted away from this second cold chamber. Commercial Electric (China) has marketed lamps (T3 spiral CFL) with such a discharge tube configuration. FIG. 1 shows this prior art configuration in a perspective view, while FIG. 2 is a top view and FIG. 3 a cross sectional side view of FIG. 2 taken along the plane A-A.

In a first embodiment of the invention, as shown in FIGS. 4 to 7, the discharge tube arrangement 10 has a helical form comprising a single tube with substantially straight end sections 15, 16 and an intermediate portion comprising two helical tube members 11, 12 between the end sections. The end sections 15, 16 are at one end of the tube arrangement and in proximity to each other and the intermediate portion has a coiled configuration wound about the central axis 18 of the discharge tube arrangement 10. In the shown embodiment, the individual coil members of the helical tube have substantially the same diametrical dimension. The tube has a substantially circular cross section with a substantially constant cross sectional dimension. The end sections 15, 16 of the tube are closed by a gas tight sealing and comprise an electrode assembly in order to produce a discharge arc within the tube. The tube is filled with a discharge gas such as for example argon for maintaining the discharge. Mercury is added to the discharge gas in order to generate UV radiation when a discharge is present within the tube. The inside wall of the discharge tube is covered with a luminescent layer, typically a blend of different phosphor components, that converts UV radiation into visible light.

Mercury, which is responsible for the CFL's light generation, is generally dosed to the discharge tube in the form of an amalgam (amalgam type CFL), as a pellet, or liquid (liquid Hg type CFL). The pellet is one kind of amalgam, which may be a Hg—Zn-alloy, but it is melted and evaporated due to the heat developed in the lamp and therefore behaves as liquid Hg during the operation of the lamp. The amalgam type CFL-s are not sensitive to the operating position of the lamp, however they exhibit a longer warm-up time. The advantage of CFL-s operating as liquid Hg type is the relatively shorter warm-up time (<60 seconds). However, the Hg vapor pressure, which is a key factor for the light output, has an optimum value only in a narrow ambient temperature range. The Hg vapor pressure is controlled by the temperature of the coldest point of the discharge tube (cold spot). So, this type of (CFL-s cannot be used at high ambient temperatures or at relatively higher wattages.

Figure 4:
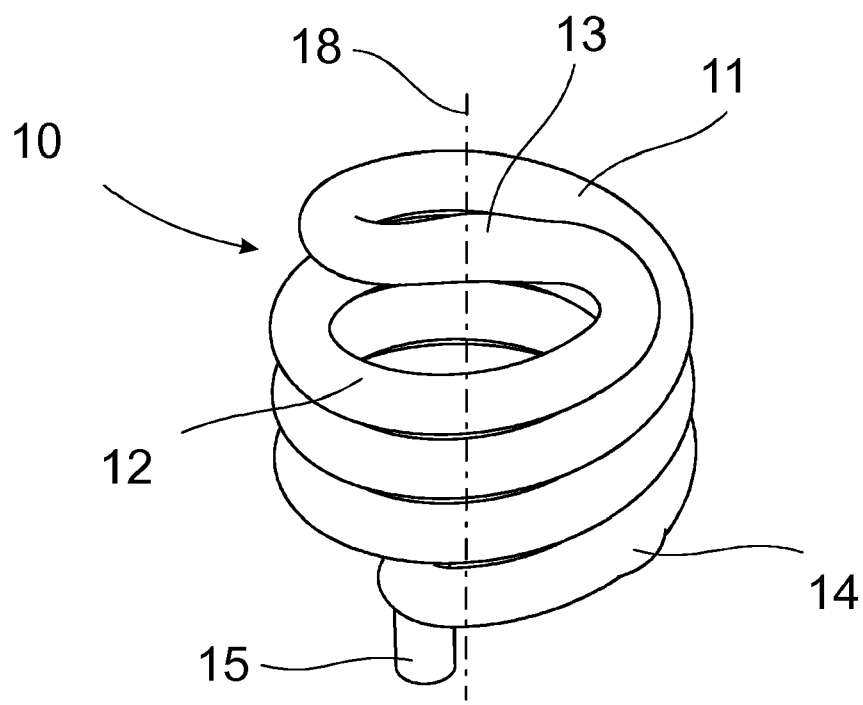
FIG. 4 is a perspective view of a low pressure helical discharge lamp with a second cold chamber formed on an outer tube wall.
Figure 5:
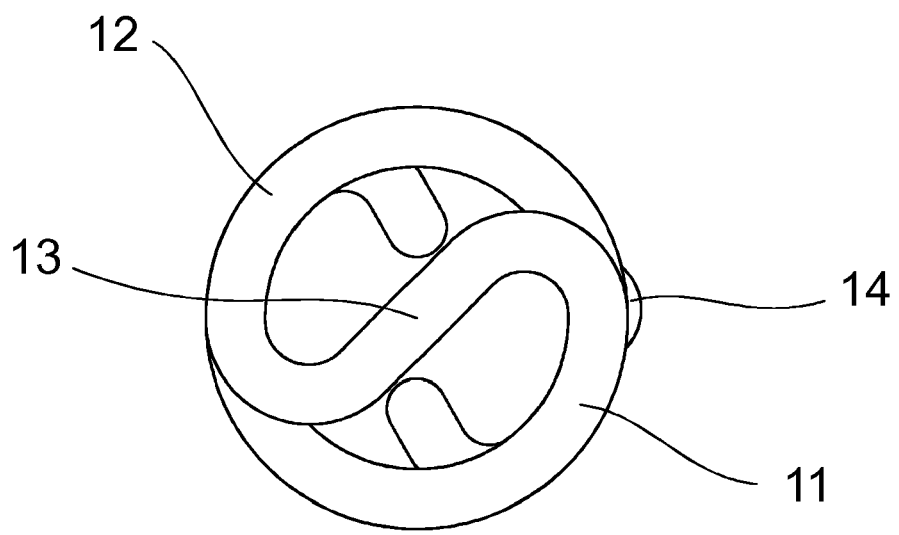
FIG. 5 is a top view of the low-pressure discharge lamp shown in FIG. 4.

The discharge tube arrangement shown in FIG. 4 comprises a first cold chamber 13 or cold spot, which is a typical solution and widely used in CFL-s in order to regulate and maintain the mercury vapor pressure within the discharge tube. This first cold chamber however, as previously discussed, operates only with the desired effect in a base-up position of the lamp. An example of this is a lamp in the ceiling where the envelope extends downward out of the ceiling. The efficiency of the compact fluorescent lamp in a base-up position with the cold spot at a distal end portion opposite to the longitudinal end portion comprising the electrodes is based upon the fact that the coldest spot of the lamp is generally the lowest point because of the cooling effect of the ambient air. The heat generated by the lamp (ballast and electrodes) does not substantially reach the cold spot, since warm air flows upward.

However, when the lamp is operated in a base-down position, i.e., where the base is below the envelope such that the envelope extends upward therefrom (such as in a table lamp for instance), the lamp will have a luminous output, which is at least 10% or tip to 20% lower than that if the lamp is operated in an optimum base-up position. This reduction of the luminous output of the lamp is a result of the lack of cooling of the first cold spot portion, which in the base-down position is not cooled but rather heated by the electrodes and the ballast.

Figure 6:
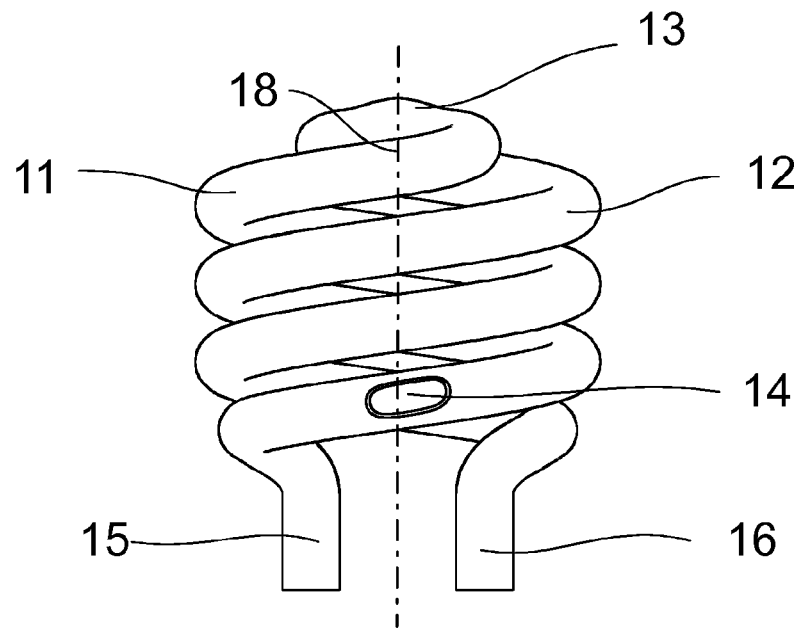
FIG. 6 is a side view of the low-pressure discharge lamp shown in FIG. 4, with a second cold chamber.

In order to avoid the negative effect of operating the discharge tube or lamp in a position other than the base-up position, at least one second cold chamber 14 is suggested on the outer wall of the tube relative to the central axis with a cold chamber wall protruding substantially away from the central axis 18 of the discharge tube arrangement 10. Therefore in a first embodiment, shown in FIGS. 4 to 7, there is provided a second cold chamber 14 on the outer wall of the discharge tube, on the helical portion of the tube arrangement, and even more specifically on a coil member of the discharge tube arrangement next to the straight sections 15, 16 of the discharge tube arrangement. This is a location where the cooling effect of the ambient air is sufficient to provide an efficient cooling of the second cold chamber 14 even in a base-clown position, as best seen in FIGS. 4 and 6. It is important that the location selected for the second cold chamber is far enough from the tube ends comprising the electrodes, which develop a large amount of heat during lamp operation. As it will be apparent to those skilled in the art, the second cold chamber 14 could be placed on any of the coil members of the discharge tube arrangement. Therefore, the second cold chamber may be located at the same distance from the longitudinal end portions of the discharge tube arrangement, or at different distances from the longitudinal end portions of the discharge tube arrangement, with substantially the same effect.

Figure 7:
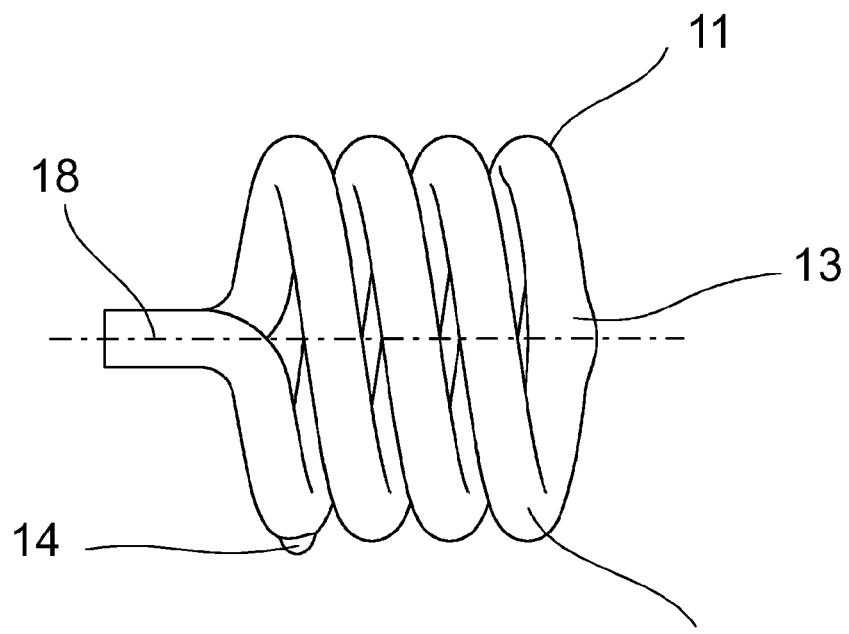
FIG. 7 is a side view of the low-pressure discharge lamp shown in FIG. 4, with a second cold chamber.

When the CFL is operated in a horizontal position, e.g. the base and the lamp fixture are on the left side or right side of the lamp, the second cold chamber 14 will have an arbitrary position relative to the central axis 18 of the lamp. In ideal case, the second cold chamber 14 will be positioned at the lowest point below the central axis 18 of the lamp, as illustrated in FIG. 7. However, if the lamp in the fixture will have an orientation with the second cold chamber 14 in an upper position above the central axis 18 of the lamp, the second cold chamber 14 will not have the same effect, because the cooling effect of the ambient air will decrease and the heating effect of the discharge arc will increase. In order to address this problem, at least one further second cold chamber may be applied on the outer wall of the discharge tube arrangement. When more than one second cold chamber is provided on the helical part of the discharge tube arrangement, it might be advantageous to distribute the second cold chambers substantially equally along the circumference of the discharge tube arrangement. A substantially equal distribution of the second cold chambers along the circumference means that when viewed from the top (top view of FIG. 5), the central angles between the neighbouring second cold chambers is substantially equal. The vertical location of the individual second cold chambers is indifferent, therefore the second cold chambers may be located on the same coil member of the discharge tube arrangement, or they may be located on the different coil members of the discharge tube arrangement as well. It is clear that with increasing the number of the second cold chambers, the likelihood that one of the cold chambers will be positioned optimally at the lowest point of the lamp, will also increase.

The second cold chamber 14 may have a circular cross section taken in a plane tangential to the coil members of the helical portion of the discharge tube arrangement or it may be elongated. In other words, the at least one second cold chamber may have a length dimension parallel to the central axis of the discharge tube and a width dimension oriented transversal to the length dimension, wherein the length dimension of the second cold chamber may be equal to or larger than the width dimension of the second cold chamber.

In order to increase the cooling effect of ambient air, the wall thickness of the second cold chamber may be selected smaller than the wall thickness of the discharge tube.

The total surface of the second cold chamber, and particularly, the volume of the second cold chamber may not be selected arbitrarily. When forming a second cold chamber for a discharge lamp, care must be taken to avoid an oversized second cold chamber, which would mean that some parts of the second cold chamber wall are too far from the discharge arc, and thereby resulting in a cold spot with an average temperature below the optimum value of approximately 45° C.

Also, it is generally desirable to bring the discharge arc so close to the wall of the discharge tube as possible, i.e. there is a tendency to make the diameter of the discharge tube as small as possible. With thin discharge tubes, a relatively small annular widening of the tube would be enough to provide an efficient second cold chamber, but the useful light-emitting surface of the second cold chamber would still be relatively small. This is because with an annular widening or expansion of the discharge tube, the volume increases proportional to the third power of the size, while the surface increases proportional to the second power only.

If the widening or expansion of the discharge tube is made along one dimension only, as shown in the figures, the increase in volume is approximately proportional with the second power of amount of the widening, and the same applies to the increase in the surface. Therefore, the surface of the second cold chamber portion, which is useful as a light-emitting surface, will increase linearly proportionally with the volume of the resulting cold chamber.

Typically, the diameter of the discharge tube 2 at the tube portions 11, 12 is between 6-15 mm, the wall thickness being 0.8-1.2 mm. As already mentioned above, the temperature of the cold spot on the second cold chamber may be also influenced by the wall thickness of the cold clamber. Therefore, it is foreseen that the wall thickness is reduced at least in some regions of the second cold chamber. The reduced thickness may be as low as 0.4 mm. The reduced wall thickness is achieved when the cold chamber is formed, e.g. by blowing or casting the glass into a properly shaped mold.

In a second embodiment, as illustrated in FIGS. 8 to 11, the discharge tube arrangement 30 is comprised of straight tube members 31, 32 with a longitudinal axis substantially parallel to the central axis 38 of the fluorescent lamp and the neighboring tube members being connected to each other in series to form a continuous arc path. The tube members 31, 32 have a substantially circular cross section with a substantially constant cross sectional dimension. The end sections of the tube are closed by a gas tight sealing and comprise an electrode assembly in order to produce a discharge arc within the tube. The tube is tilled with a discharge gas for maintaining the discharge. Mercury is added to the discharge gas in order to generate UV radiation when a discharge is present within the tube. The inside wall of the discharge tube is covered with a luminescent layer, typically a blend of different phosphor components that converts UV radiation into visible light. The first cold camber or chambers 33 of this configuration are formed as an extension of the straight tube sections 31, 32 beyond a so-called bridge section interconnecting the neighbouring straight tube sections. Also, this lamp operates with maximum luminous output in the base-up position, in which the first cold chambers are located at the lowest point of the lamp.

However, in a base-down position, the lamp will have a luminous output, which is at least 10% or up to 20% below the optimum. This reduction of the luminous output of the lamp is a result of the lack of cooling of the first cold spot portion, which in the base-down position is not cooled but rather heated by the electrodes and the discharge arc as well as the ballast if the lamp is an integral type one.

Figure 8:
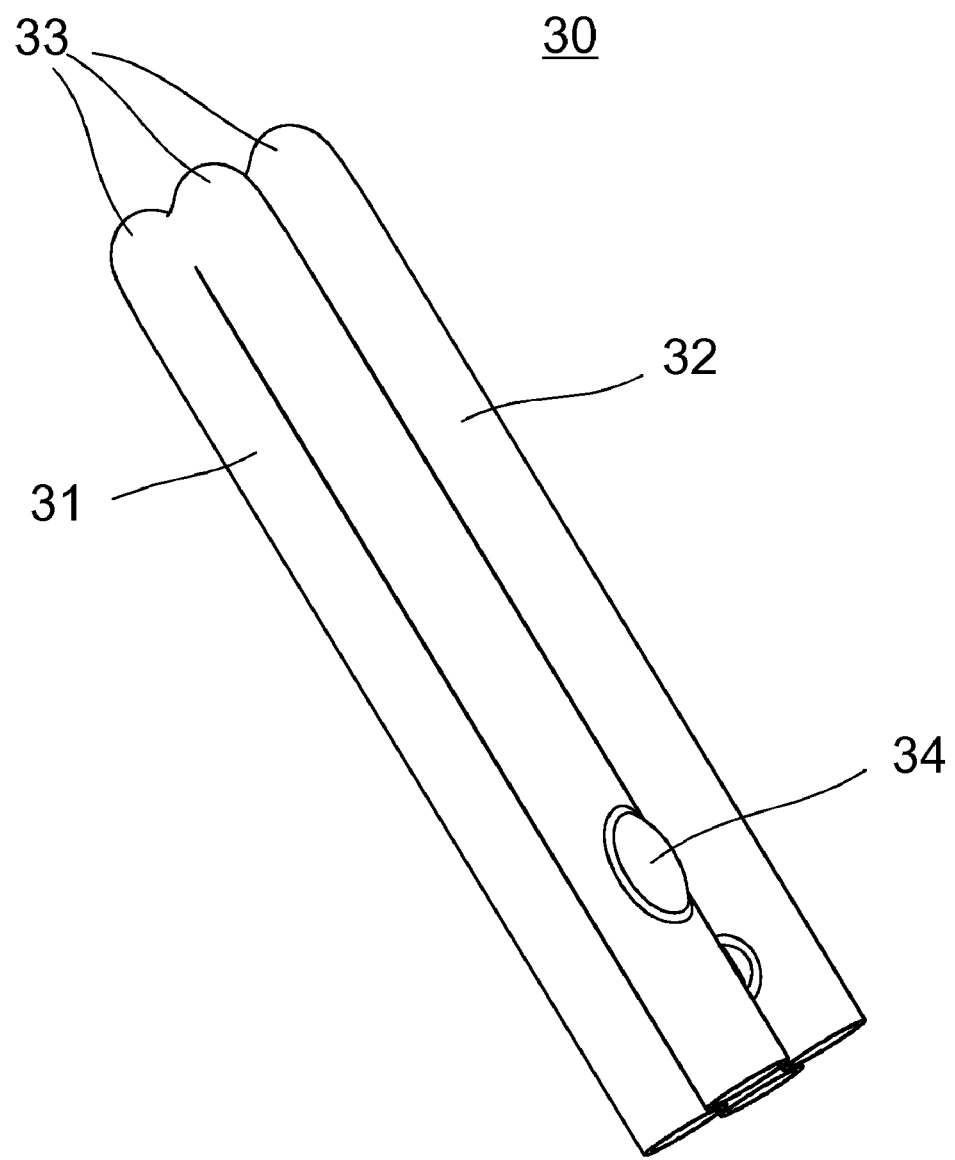
FIG. 8 is a perspective view of a multi-finger type low-pressure discharge lamp with a second cold chamber formed on an outer tube wall.

In order to avoid the negative effect of operating the discharge tube or lamp in a position other than the base-up position, at least one second cold chamber 34 is suggested on the outer wall of the tube relative to the central axis 38 with a cold chamber wall protruding substantially away from the central axis 38 of the discharge tube arrangement 30. Therefore in a second embodiment of the invention, shown in FIGS. 8 to 11, there is provided a second cold chamber 34 on the outer wall of the discharge tube, near to the sealed ends of the straight tube members 31, 32. This is a location where the cooling effect of the ambient air is sufficient to provide an efficient cooling of the second cold chamber 34 even in a base-down position, as illustrated in FIGS. 8, 9 and 10. It is important that the location selected for the second cold chamber is far enough from the tube ends comprising the electrodes, which develop a large amount of heat during lamp operation.

When the CFL is operated in a horizontal position, e.g. the base and the lamp fixture are on the left side or right side of the lamp, the second cold chamber will have an arbitrary position relative to the central axis of the lamp. In ideal case, the second cold chamber 34 will be positioned at the lowest point below the central axis 38 of the lamp. However, if the lamp in the fixture will have an orientation with the second cold chamber 34 in an upper position, i.e. above the central axis 38 of the lamp, the second cold chamber will not have the same effect, because the cooling effect of the ambient air will decrease and the heating effect of the discharge arc will increase. In order to address this problem, at least one further second cold chamber may be formed on the outer wall of different tube members of the discharge tube arrangement. When more than one second cold chamber is provided on the discharge tube arrangement, it might be advantageous to distribute the second cold chambers substantially equally along the circumference of the discharge tube arrangement. The substantially equal distribution along the circumference in this configuration may mean that pairs of second cold chambers are located on opposite tube members. The maximum number of the second cold chambers would be equal to the number of the straight tube members.

Similarly to the first embodiment, the second cold chamber 34 may have a circular cross section taken in a plane perpendicular to the direction of protrusion of the second cold chamber or it may be elongated. Also the wall thickness of the second cold chamber may be selected smaller than the wall thickness of the discharge tube member, in order to increase the cooling effect of ambient air.

Figure 12:
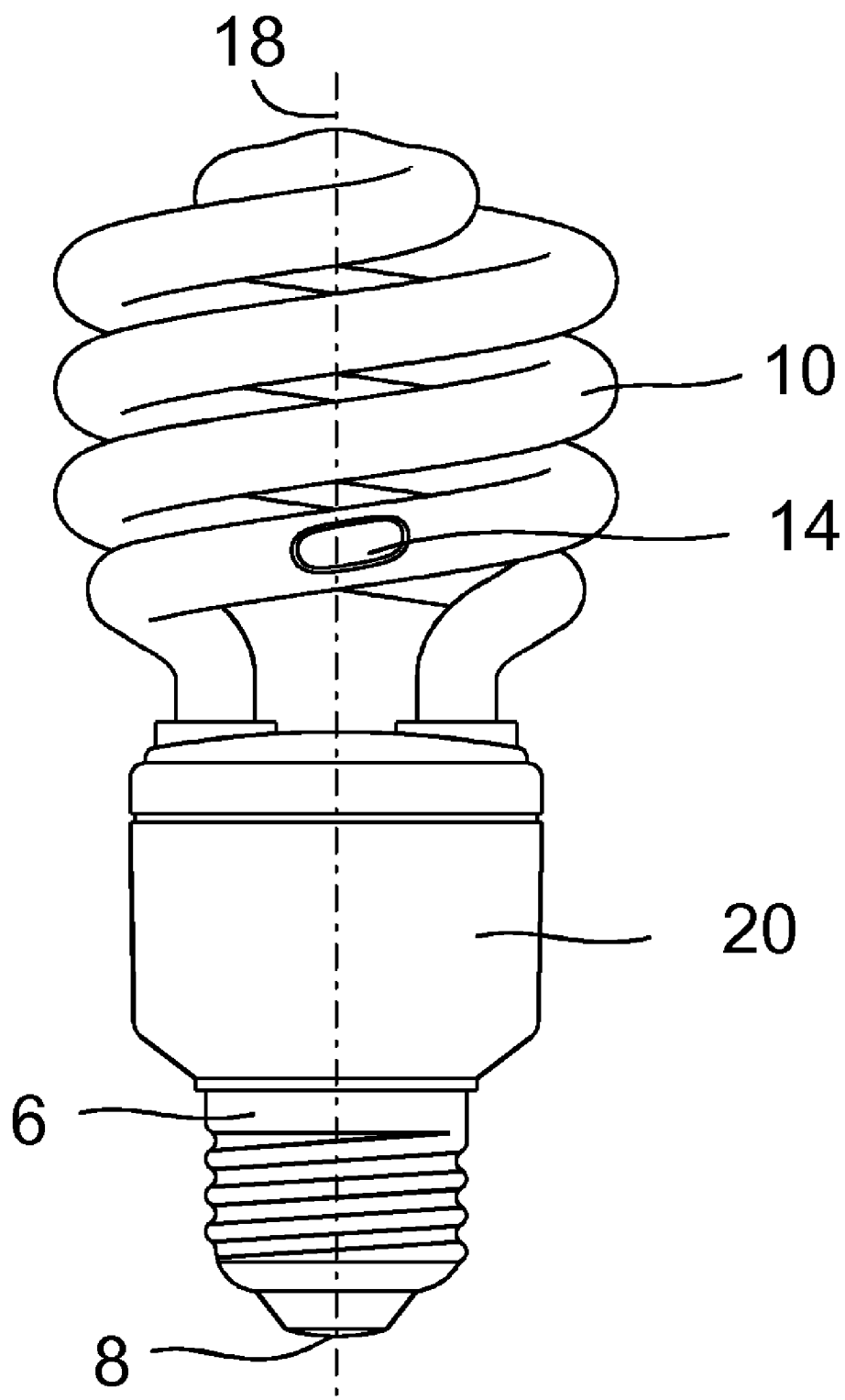
FIG. 12 is a side view of an exemplary lamp comprising a helical discharge tube.
Figure 13:
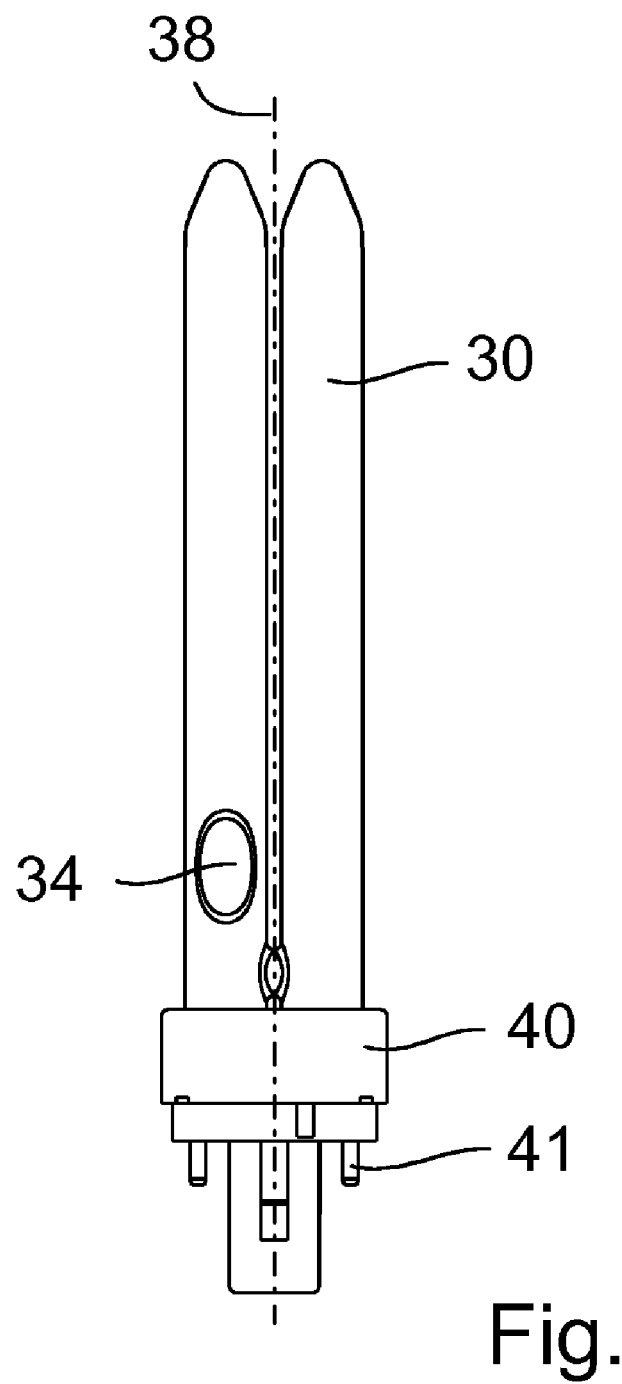
FIG. 13 is a side view of an exemplary lamp comprising a multi-finger discharge tube.

Referring now to FIGS. 12 and 13, a compact fluorescent lamp with a discharge tube arrangement 10 and 30 of the helical and multi-finger type, respectively, is shown. The lamp has a central axis 18 and 38 substantially aligned with the central axis of the discharge tube arrangement 10 and 30. The discharge tube arrangements are mechanically held and fixed in a housing 20 and 40. The housing 20 may also accommodate an electrical ballast circuit for controlling the current in the discharge tube during operation of the lamp in the screw-in type lamp shown in FIG. 12. In the example of FIG. 13 where a plug-in type lamp is depicted, an external ballast unit may be used. The housing 20 is connected to a base shell 6 of the screw-in type. The base shell 6 is provided with electrical contact element 8 to connect the lamp to a power supply, and the housing 40 forms a base of the plug-in type with electrical contact pins 41 for energizing the lamp. The discharge tube arrangements have two longitudinal end portions and are provided with a first cold chamber at one end portion opposite to the base side and a second cold chamber 14 and 34 between the two longitudinal end portions. The discharge tube arrangements have already been described in detail above.

The invention is not limited to the shown and disclosed embodiments, but other elements, improvements and variations or equivalents thereof are also within the scope of this invention as it may be apparent to those skilled in the art.

The invention claimed is:

1. A discharge tube arrangement for a compact fluorescent lamp, the discharge tube arrangement having a central axis and longitudinal end portions, and being formed of at least one discharge tube made of glass, enclosing a discharge volume filled with a discharge gas and having a fluorescent phosphor coating disposed on an inner surface portion of the tube, the tube forming a continuous arc path and further being provided with electrodes disposed at each end of the arc path;

the discharge tube arrangement comprising a first cold chamber in order to control and maintain a required mercury vapor pressure, being located in one of the longitudinal end portions of the tube arrangement;

the discharge tube arrangement further comprising at least one second cold chamber being positioned between the longitudinal end portions of the discharge tube arrangement, and the at least one second cold chamber being positioned on the wall of the tube and having a cold chamber wall protruding substantially away from the central axis of the discharge tube arrangement.

2. The discharge tube arrangement of claim 1, in which the at least one second cold chamber has a length dimension parallel to the axis of the discharge tube and a width dimension oriented transversal to the length dimension, wherein the length dimension is equal to the width dimension.

3. The discharge tube arrangement of claim 1, in which the at least one second cold chamber has a length dimension parallel to the axis of the discharge tube and a width dimension oriented transversal to the length dimension, wherein the length dimension is larger than the width dimension.

4. The discharge tube arrangement of claim 1, in which the wall thickness of the at least one second cold chamber is smaller than the wall thickness of the discharge tube.

5. The discharge tube arrangement of claim 1, in which the second cold chambers are distributed substantially equally along the circumference of the discharge tube arrangement.

6. The discharge tube arrangement of claim 1, in which the second cold chambers are located substantially at the same distance from the longitudinal end portions of the discharge tube arrangement.

7. The discharge tube arrangement of claim 1, in which the second cold chambers are located at different distances from the longitudinal end portions of the discharge tube arrangement.

8. The discharge tube arrangement of claim 1, which is comprised of a single tube with substantially straight end sections and an intermediate portion between the end sections and the end sections being positioned in one of the longitudinal end portions and in proximity to each other and the intermediate portion having a coiled configuration wound about the central axis of the discharge tube arrangement.

9. The discharge tube arrangement of claim 1, which is comprised of straight tubes, each tube having an axis substantially parallel to the central axis of the discharge tube arrangement and the neighboring tubes being connected to each other in series to form a continuous arc path.

10. A compact fluorescent lamp defining a central axis and comprising a discharge tube arrangement, the discharge tube arrangement having longitudinal end portions and being formed of at least one discharge tube made of glass, enclosing a discharge volume filled with a discharge gas and having a fluorescent phosphor coating disposed on an inner surface portion of the tube, the tube forming a continuous arc path and further being provided with electrodes disposed at each end of the arc path;

the discharge tube arrangement comprising a first cold chamber in order to control and maintain a partial mercury vapor pressure, being located in one of the longitudinal end portions of the tube arrangement;

the discharge tube arrangement being provided with at least one second cold chamber positioned between the longitudinal end portions of the discharge tube arrangement, and the at least one second cold chamber being positioned on the wall of the tube and having a cold chamber wall protruding substantially away from the central axis of the lamp.

11. The compact fluorescent lamp of claim 10, in which the at least one second cold chamber has a length dimension parallel to the axis of the discharge tube and a width dimension oriented transversal to the length dimension, wherein the length dimension is equal to the width dimension.

12. The compact fluorescent lamp of claim 10, in which the at least one second cold chamber has a length dimension parallel to the axis of the discharge tube and a width dimension oriented transversal to the length dimension, wherein the length dimension is larger than the width dimension.

13. The compact fluorescent lamp of claim 10, in which the wall thickness of the at least one second cold chamber is smaller than the wall thickness of the discharge tube.

14. The compact fluorescent lamp of claim 10, in which the second cold chambers are distributed substantially equally along the circumference of the discharge tube arrangement.

15. The compact fluorescent lamp of claim 10, in which the second cold chambers are located substantially at the same distance from the longitudinal end portions of the discharge tube arrangement.

16. The compact fluorescent lamp of claim 10, in which the second cold chambers are located at different distances from the longitudinal end portions of the discharge tube arrangement.

17. The compact fluorescent lamp of claim 10, in which the discharge tube arrangement is comprised of a single tube with substantially straight end sections and an intermediate portion between the end sections and the end sections being positioned in one of the longitudinal end portions and in proximity to each other and the intermediate portion having a coiled configuration wound about the central axis of the lamp.

18. The compact fluorescent lamp of claim 10, in which the discharge tube arrangement is comprised of straight tubes, each tube having an axis substantially parallel to the central axis of the fluorescent lamp and the neighboring tubes being connected to each other in series to form a continuous arc path.

19. A compact fluorescent lamp defining a central axis and comprising a discharge tube arrangement, the discharge tube arrangement having longitudinal end portions and being formed of at least one discharge tube made of glass, enclosing a discharge volume filled with a discharge gas and having a fluorescent phosphor coating disposed on an inner surface portion of the tube, the tube forming a continuous arc path and further being provided with electrodes disposed at each end of the arc path;

the discharge tube arrangement being comprised of straight tubes, each tube having an axis substantially parallel to the central axis of the fluorescent lamp and the neighboring tubes being connected to each other in series to form a continuous arc path;

the discharge tube arrangement comprising a first cold chamber in order to control and maintain a partial mercury vapor pressure, being located in one of the longitudinal end portions of the tube arrangement; and the discharge tube arrangement being provided with at least one second cold chamber positioned between the longitudinal end portions of the discharge tube arrangement, the at least one second cold chamber being positioned on the wall of the tube and having a cold chamber wall protruding substantially away from the central axis of the lamp.

20. A compact fluorescent lamp defining a central axis and comprising a discharge tube arrangement, the discharge tube arrangement having longitudinal end portions and being formed of a single tube made of glass with substantially straight end sections and an intermediate portion between the end sections and the end sections being positioned in one of the longitudinal end portions of the tube arrangement and in proximity to each other and the intermediate portion having a coiled configuration wound about the central axis of the lamp with coiled helical parts and a turning part connecting the helical parts;

the tube enclosing a discharge volume filled with a discharge gas and having a fluorescent phosphor coating disposed on an inner surface portion of the tube, the tube forming a continuous arc path and further being provided with electrodes disposed at each end of the arc path;

the discharge tube arrangement comprising a first cold chamber in order to control and maintain a partial mercury vapor pressure and being located on the turning part in the other longitudinal end portion of the discharge tube arrangement;

the discharge tube arrangement being provided with at least one second cold chamber positioned between the longitudinal end portions of the discharge tube arrangement, and the at least one second cold chamber being positioned on the wall of the tube and having a cold chamber wall protruding substantially away from the central axis of the lamp.

21. The compact fluorescent lamp of claim 20, in which the at least one second cold chamber is located on the coil member of the discharge tube arrangement next to the straight sections of the discharge tube arrangement.

* * * * *